US012533930B2

(12) United States Patent
Yun

(10) Patent No.: US 12,533,930 B2
(45) Date of Patent: Jan. 27, 2026

(54) VEHICLE CONTROL SYSTEM INTO WHICH BATTERY TEMPERATURE MANAGEMENT AND AIR CONDITIONING ARE INTEGRATED

(71) Applicants: Hyundai Motor Company, Seoul (KR); Kia Corporation, Seoul (KR)

(72) Inventor: Nam-Seok Yun, Hwaseong-Si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 221 days.

(21) Appl. No.: 18/208,185

(22) Filed: Jun. 9, 2023

(65) Prior Publication Data

US 2024/0066953 A1    Feb. 29, 2024

(30) Foreign Application Priority Data

Aug. 31, 2022  (KR) .................. 10-2022-0109726

(51) Int. Cl.
*B60H 1/00* (2006.01)
*B60H 1/32* (2006.01)

(52) U.S. Cl.
CPC ..... *B60H 1/00899* (2013.01); *B60H 1/00007* (2013.01); *B60H 1/00278* (2013.01); *B60H 1/3205* (2013.01)

(58) Field of Classification Search
CPC ............ B60H 1/00899; B60H 1/00007; B60H 1/00278; B60H 1/3205; B60H 1/00907; B60H 1/32284; B60H 1/323; B60H 2001/00307; B60H 1/00321; B60H 1/00371; B60H 1/00392; B60H 1/00485;
(Continued)

(56) References Cited

U.S. PATENT DOCUMENTS 4,007,315 A * 2/1977 Brinkmann ......... H01M 10/653
429/62
6,357,541 B1 * 3/2002 Matsuda ................ B60K 11/02
903/905

(Continued)

FOREIGN PATENT DOCUMENTS

CA    2736341 A1 * 12/2011 .............. B60L 50/40
CA    2778026 A1 * 11/2012 ............. B60H 1/143
(Continued)

*Primary Examiner* — Eric S Ruppert
*Assistant Examiner* — Kirstin U Oswald
(74) *Attorney, Agent, or Firm* — Morgan Lewis & Bockius LLP

(57) ABSTRACT

A vehicle control system into which battery temperature management and air conditioning are integrated includes a battery temperature management unit setting a temperature of a battery module provided in a vehicle to be in a predetermined range, by circulating a coolant, an air conditioning unit operating as an air conditioner or a heat pump according to a circulation direction of a refrigerant, a heat exchange unit causing the coolant and the refrigerant to exchange heat with each other, and a controller performing control so that the battery temperature management unit operates, that the air conditioning unit operates as the air conditioner or the heat pump according to a request for cooling of air inside of the vehicle or a request for heating of the air inside of the vehicle, and that the heat exchange unit selectively absorbs heat of the refrigerant.

14 Claims, 9 Drawing Sheets

(58) Field of Classification Search
CPC .............. B60H 1/3227; B60H 1/32281; B60H
1/00921; B60H 1/143; B60H 1/2221;
B60H 2001/3255; H01M 10/613; H01M
10/615; H01M 10/625; H01M 10/63;
H01M 10/6556; H01M 10/6568; H01M
10/663; B60L 58/26; B60L 58/27; B60Y
2304/03; B60Y 2304/05; F25B 2400/06
USPC ........................................................ 62/115
See application file for complete search history.

(56) References Cited

U.S. PATENT DOCUMENTS

| | | | | |
|---|---|---|---|---|
| 8,191,618 | B2 * | 6/2012 | Gering | F01P 11/20 123/41.31 |
| 9,810,137 | B2 * | 11/2017 | Presetschnik | H01M 10/6569 |
| 9,827,846 | B2 * | 11/2017 | Porras | B60K 11/085 |
| 10,252,599 | B2 | 4/2019 | Kim et al. | |
| 10,800,270 | B1 * | 10/2020 | Kuo | B60L 3/0015 |
| 11,214,115 | B2 * | 1/2022 | Harper | H01M 10/052 |
| 11,448,437 | B2 | 9/2022 | Ryu et al. | |
| 11,688,903 | B2 * | 6/2023 | Porras | H01M 10/6569 62/118 |
| 11,919,360 | B2 * | 3/2024 | Takagi | B60H 1/32284 |
| 2003/0188543 | A1 * | 10/2003 | Trecate | F25D 16/00 62/96 |
| 2005/0133215 | A1 * | 6/2005 | Ziehr | B60L 58/27 62/238.7 |
| 2010/0012295 | A1 * | 1/2010 | Nemesh | H01M 10/6568 165/104.19 |
| 2011/0174000 | A1 * | 7/2011 | Richter | B60H 1/00064 62/93 |
| 2012/0234518 | A1 * | 9/2012 | Brodie | F28D 20/028 165/104.31 |
| 2012/0327596 | A1 * | 12/2012 | Anderson-Straley | H01M 10/625 361/689 |
| 2013/0061627 | A1 * | 3/2013 | Neumeister | B60L 58/27 165/96 |
| 2013/0074525 | A1 * | 3/2013 | Johnston | B60H 1/323 62/126 |
| 2013/0106178 | A1 * | 5/2013 | Girard | H02J 7/0048 307/9.1 |
| 2013/0106357 | A1 * | 5/2013 | Girard | B60L 58/26 320/126 |
| 2013/0166119 | A1 * | 6/2013 | Kummer | H01M 10/625 701/22 |
| 2013/0269911 | A1 * | 10/2013 | Carpenter | B60H 1/004 165/104.19 |
| 2014/0014421 | A1 * | 1/2014 | Carpenter | B60H 1/00278 237/28 |
| 2014/0046524 | A1 * | 2/2014 | Brown | H01M 10/48 701/22 |
| 2014/0052411 | A1 * | 2/2014 | Skelton | B60L 50/16 702/183 |
| 2014/0060102 | A1 * | 3/2014 | Nemesh | B60H 1/00278 62/238.7 |
| 2014/0062228 | A1 * | 3/2014 | Carpenter | B60K 11/02 310/53 |
| 2014/0096550 | A1 * | 4/2014 | Gao | B60L 58/21 62/126 |
| 2014/0216693 | A1 * | 8/2014 | Pekarsky | H01M 10/625 165/104.31 |
| 2014/0216709 | A1 * | 8/2014 | Smith | B60H 1/00278 165/41 |
| 2014/0266038 | A1 * | 9/2014 | Gibeau | B60L 15/20 320/109 |
| 2014/0277869 | A1 * | 9/2014 | King | B60W 10/26 701/22 |
| 2015/0032318 | A1 * | 1/2015 | Gao | B60H 1/00392 903/903 |
| 2016/0107501 | A1 * | 4/2016 | Johnston | B60H 1/00278 165/41 |
| 2016/0107508 | A1 * | 4/2016 | Johnston | B60H 1/00278 237/12.3 A |
| 2016/0129756 | A1 * | 5/2016 | Enomoto | B60H 1/22 62/244 |
| 2016/0248129 | A1 * | 8/2016 | Dunham | H01M 10/625 |
| 2016/0339760 | A1 * | 11/2016 | Dunn | H01M 10/625 |
| 2016/0344075 | A1 * | 11/2016 | Blatchley | B60K 1/00 |
| 2016/0351981 | A1 * | 12/2016 | Porras | H01M 10/6569 |
| 2017/0021698 | A1 * | 1/2017 | Hatakeyama | B60H 1/143 |
| 2017/0087957 | A1 * | 3/2017 | Blatchley | B60H 1/321 |
| 2017/0088006 | A1 * | 3/2017 | Blatchley | B60H 1/323 |
| 2017/0197488 | A1 * | 7/2017 | Kim | H01M 10/625 |
| 2017/0217279 | A1 * | 8/2017 | Jalilevand | B60H 1/00885 |
| 2017/0297407 | A1 * | 10/2017 | Shan | B60H 1/00278 |
| 2017/0309976 | A1 * | 10/2017 | Lambert | B60H 1/00278 |
| 2017/0313158 | A1 * | 11/2017 | Porras | B60H 1/00828 |
| 2017/0317393 | A1 * | 11/2017 | Blatchley | H01M 10/625 |
| 2018/0001784 | A1 * | 1/2018 | Porras | B60K 11/02 |
| 2018/0006347 | A1 * | 1/2018 | Porras | H01M 10/486 |
| 2018/0050605 | A1 * | 2/2018 | Lewis | B60L 58/25 |
| 2018/0111443 | A1 * | 4/2018 | Kim | B60H 1/00278 |
| 2018/0117991 | A1 | 5/2018 | Kim et al. | |
| 2018/0215231 | A1 * | 8/2018 | Porras | B60H 1/323 |
| 2018/0323482 | A1 * | 11/2018 | Miura | H01M 10/6568 |
| 2019/0047360 | A1 * | 2/2019 | Kishita | B60H 1/32284 |
| 2019/0070924 | A1 * | 3/2019 | Mancini | B60H 1/32281 |
| 2019/0291540 | A1 * | 9/2019 | Gutowski | B60H 1/00278 |
| 2019/0366800 | A1 * | 12/2019 | Durrani | B60H 1/00907 |
| 2020/0031194 | A1 * | 1/2020 | Lee | B60H 1/00392 |
| 2020/0215871 | A1 * | 7/2020 | Tomita | B60H 1/26 |
| 2020/0231024 | A1 * | 7/2020 | Shrivastava | B60H 1/00978 |
| 2020/0247212 | A1 * | 8/2020 | Bara | B60H 1/10 |
| 2020/0274210 | A1 * | 8/2020 | Bae | H01M 10/63 |
| 2020/0290426 | A1 * | 9/2020 | Aikawa | B60H 1/00899 |
| 2020/0290431 | A1 * | 9/2020 | Aikawa | B60H 1/3228 |
| 2020/0324611 | A1 * | 10/2020 | Yano | B60H 1/32284 |
| 2020/0346520 | A1 * | 11/2020 | Ishizeki | B60H 1/00328 |
| 2020/0353790 | A1 * | 11/2020 | Miyoshi | B60H 1/32284 |
| 2020/0361280 | A1 * | 11/2020 | Hashimoto | B60H 1/00885 |
| 2020/0376920 | A1 * | 12/2020 | Harper | B60H 1/00907 |
| 2021/0008951 | A1 * | 1/2021 | Aikawa | B60H 1/3205 |
| 2021/0278113 | A1 | 9/2021 | Ryu et al. | |
| 2021/0296964 | A1 * | 9/2021 | Sakamoto | H05K 7/20872 |
| 2021/0323381 | A1 * | 10/2021 | Orihashi | B60H 1/00485 |
| 2021/0379962 | A1 * | 12/2021 | Kim | B60H 1/32284 |
| 2022/0011006 | A1 * | 1/2022 | Miura | B60H 1/143 |
| 2022/0055608 | A1 * | 2/2022 | Edman | B60W 10/08 |
| 2022/0069387 | A1 * | 3/2022 | Maeda | H01M 10/625 |
| 2022/0176771 | A1 | 6/2022 | Wada et al. | |
| 2022/0212517 | A1 * | 7/2022 | Yu | B60H 1/00392 |
| 2022/0266651 | A1 * | 8/2022 | Jeong | B60H 1/2221 |
| 2022/0302519 | A1 * | 9/2022 | Tsuruta | H01M 10/635 |
| 2022/0371403 | A1 * | 11/2022 | Miyoshi | B60H 1/32284 |
| 2022/0402331 | A1 * | 12/2022 | Tada | B60H 1/00821 |
| 2024/0066953 | A1 * | 2/2024 | Yun | B60H 1/3205 |

FOREIGN PATENT DOCUMENTS

| | | | | |
|---|---|---|---|---|
| CN | 102781693 A | * | 11/2012 | ........ B60H 1/32281 |
| CN | 105480050 A | * | 4/2016 | ........ B60H 1/00878 |
| DE | 102011051624 A1 | * | 1/2013 | ............ B60K 1/00 |
| EP | 1124097 B1 | * | 4/2004 | ........... F25B 49/027 |
| EP | 3012133 A2 | * | 4/2016 | ........ B60H 1/00278 |
| EP | 3367495 A1 | * | 8/2018 | ........ H01M 10/0617 |
| JP | 2003314862 A | * | 11/2003 | |
| JP | 2016199203 A | * | 12/2016 | |
| JP | 2019-0119369 A | | 7/2019 | |
| JP | 2020-0152278 A | | 9/2020 | |
| JP | 2020-0185829 A | | 11/2020 | |
| KR | 20170139204 A | * | 12/2017 | ........... H01M 10/60 |
| KR | 10-1846923 B1 | | 4/2018 | |
| KR | 10-2020-0061426 A | | 6/2020 | |
| KR | 10-2020-0103391 A | | 9/2020 | |
| KR | 10-2245149 B1 | | 4/2021 | |

* cited by examiner

VEHICLE CONTROL SYSTEM INTO WHICH BATTERY TEMPERATURE MANAGEMENT AND AIR CONDITIONING ARE INTEGRATED

CROSS-REFERENCE TO RELATED APPLICATION

The present application claims priority to Korean Patent Application No. 10-2022-0109726, filed on Aug. 31, 2022, the entire contents of which is incorporated herein for all purposes by this reference.

BACKGROUND OF THE PRESENT DISCLOSURE

Field of the Present Disclosure

The present disclosure relates to a vehicle control system into which battery temperature management and air conditioning are integrated, the vehicle control system being capable of being mounted in a vehicle and integrally controlling temperature management of a high-voltage battery and air conditioning of a passenger compartment.

Description of Related Art

An air conditioning system for air conditioning of a passenger compartment in which a passenger rides is provided in a vehicle.

For example, as illustrated in FIG. 1, an air conditioning system 120 is provided on a roof of a vehicle 100, such as a bus, that transports a large number of passengers.

In recent years, due to vehicle electrification, the vehicles, including electric buses, that use a drive motor driven with electric power, have grown in popularity. Normally, a battery module BM is mounted on a roof of the electric bus, and a radiator 110 for radiating heat of a coolant cooling the battery module BM may also be mounted on the roof thereof.

The air conditioning system 120 and the battery module BM are mounted on the roof thereof, but the air conditioning system 120 and a temperature management system for controlling a temperature of the battery module BM are configured to operate independently. Accordingly, the air conditioning system 120 and the temperature management system for the battery module BM operate independently of each other. Thus, one of the two systems cannot receive assistance with respect to a cooling or warming operation from the other one thereof. Accordingly, the capacity of each of the two systems needs to be increased. This need is a factor in increasing the manufacturing cost and the weight of the vehicle.

The information included in this Background of the present disclosure is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing a vehicle control system into which battery temperature management and air conditioning are integrated. In the vehicle control system, a temperature management system for controlling a temperature of a high-voltage battery in a vehicle and an air conditioning system for air conditioning of a passenger compartment operate in a compensational manner by a coolant in the temperature management system and in a refrigerant in the air conditioning system exchanging heat with each other.

To accomplish the above-mentioned object, according to an aspect of the present disclosure, there is provided a vehicle control system into which battery temperature management and air conditioning are integrated, the vehicle control system including a battery temperature management unit configured to set a temperature of a battery module provided in a vehicle to be in a predetermined range, by circulating a coolant to the battery module; an air conditioning unit configured to operate as an air conditioner or a heat pump according to a circulation direction of a refrigerant; a heat exchange unit configured to cause the coolant and the refrigerant to exchange heat with each other; and a controller configured to perform control of the battery temperature management unit, the air conditioning unit and the heat exchange unit, so that the battery temperature management unit operates, that the air conditioning unit operates as the air conditioner or the heat pump according to a request for cooling of air inside of the vehicle or a request for heating of the air inside of the vehicle, and that the heat exchange unit selectively absorbs heat of the refrigerant.

In the vehicle control system, the heat exchange unit may include: a heater, supplied with electric power from the battery module, of which a temperature is raised when an operational signal is input thereinto from the controller, a coolant line along which the coolant circulates passing through the heater in the battery temperature management unit; and a chiller provided on the coolant line and spaced away from the heater, and an air conditioning line along which the refrigerant circulates passing through the chiller, wherein, when the refrigerant needs to absorb heat from the coolant, the refrigerant may be supplied from the air conditioning unit to the chiller.

In the vehicle control system, the air conditioning unit may include: a first air conditioning line, the refrigerant circulating along the first air conditioning line and a compressor, a direction switching valve, an external heat exchanger provided outside of the vehicle, a first expansion valve, and an internal heat exchanger provided inside of the vehicle being sequentially provided on the first air condition line; a second air conditioning line branching off from the first air conditioning line and passing through a second expansion valve and the chiller; and a third air conditioning line connecting between the first air conditioning line and the second air conditioning line, wherein the controller may cause the refrigerant to circulate along the first air conditioning line, causing the air conditioning unit to operate as the air conditioner when the request for cooling of the air inside of the vehicle is made from the inside of the vehicle, the controller may cause the refrigerant to circulate along the first air conditioning line, causing the air conditioning unit to operate as a heat pump when the request for heating of the air inside of the vehicle is made from the inside of the vehicle, and the controller may cause the refrigerant to circulate along the second air conditioning line, causing the air conditioning unit to operate as the air conditioner when the refrigerant needs to absorb the heat.

In the vehicle control system, a first expansion valve and a second expansion valve may be sequentially provided, from the external heat exchanger toward the internal heat exchanger, between the external heat exchanger and the internal heat exchanger on the first air conditioning line, a first path control valve may be provided between the first expansion valve and the second expansion valve, the second air conditioning line may branch off from the first air conditioning line between the first path control valve and the second expansion valve, and may join the first air conditioning line between the internal heat exchanger and the direction switching valve, a third expansion valve may be provided between a point where the second air conditioning line branches off from the first air conditioning line and the chiller, a second path control valve may be provided between the chiller and a point where the second air conditioning line joins the first air conditioning line on the second air conditioning line, the third air conditioning line may connect between a point on the first air conditioning line between the direction switching valve and the external heat exchanger and a point on the second air conditioning line between the chiller and the second path control valve, and a third path control valve may be provided on the third air conditioning line.

In the vehicle control system, when the request for cooling of the air inside of the vehicle is made from the inside of the vehicle, the controller may perform control so that the refrigerant circulates back to the compressor from the compressor through the external heat exchanger and the internal heat exchanger in the air conditioning unit and that the refrigerant is expanded in the second expansion valve.

In the vehicle control system, when a request for cooling of the battery module is made from the battery module, the controller may perform control so that the refrigerant circulates back to the compressor from the compressor through the external heat exchanger and the chiller in the air conditioning unit and that the refrigerant is expanded in the third expansion valve and the battery temperature management unit circulates the coolant along the coolant line.

In the vehicle control system, when the request for cooling of the air inside of the vehicle is made from the inside of the vehicle and a request for cooling of the battery module is made from the battery module, the controller may perform control so that a part of the refrigerant circulates back to the compressor from the compressor through the external heat exchanger and the internal heat exchanger and that the part of the refrigerant is expanded in the second expansion valve, the controller may perform control so that the rest of the refrigerant circulates back to the compressor from the compressor through the external heat exchanger and the chiller and that a rest of the refrigerant is expanded in the third expansion valve, and the battery temperature management unit may circulate the coolant along the coolant line.

In the vehicle control system, when the request for heating of the air inside of the vehicle is made from the inside of the vehicle, the controller may perform control so that the refrigerant circulates back to the compressor from the compressor through the internal heat exchanger and the external heat exchanger and that the refrigerant is expanded in the first expansion valve.

In the vehicle control system, when the request for heating of the air inside of the vehicle is made from the inside of the vehicle and a temperature of outside air is a temperate at which the refrigerant is not able to evaporate in the external heat exchanger, the controller may perform control so that the refrigerant circulates back to the compressor from the compressor through the internal heat exchanger and the chiller and that the refrigerant is expanded in the third expansion valve.

In the vehicle control system, when the request for heating of the air inside of the vehicle is made from the inside of the vehicle, a request for raising of a temperature of the battery module is made from the battery module, and a temperature of outside air is a temperate at which the refrigerant is not able to evaporate in the external heat exchanger, the controller may perform control so that the refrigerant circulates back to the compressor from the compressor through the internal heat exchanger, the third expansion valve, and the chiller, and the controller may apply electric power to the heater and may circulate the coolant along the coolant line.

In the vehicle control system, wherein, a plurality of battery modules may be provided and be arranged in parallel with each other, and the battery temperature management unit, the heat exchange unit, and the air conditioning unit may be provided in each of the battery modules.

In the vehicle control system, when the request for cooling of the air inside of the vehicle is made from the inside of the vehicle and a request for cooling of at least one battery module is made from the battery modules, the controller may independently control the battery temperature management unit, the heat exchange unit, and the air conditioning unit that are linked with the battery module, from which the request for cooling of the battery module is input, and the battery temperature management unit, the heat exchange unit, and the air conditioning unit that are linked with the battery module, from which the request for cooling of the battery module is not input.

In the vehicle control system, when the request for cooling of the air inside of the vehicle is made from the inside of the vehicle and a request for cooling of at least one battery module is made from the battery modules, the controller may independently control the battery temperature management unit, the heat exchange unit, and the air conditioning unit that are linked with the battery module, from which the request for cooling of the battery module is input, so that the refrigerant circulates back to the compressor from the compressor through the external heat exchanger, the second expansion valve, and the internal heat exchanger, and the controller may be configured to control the battery temperature management unit, the heat exchange unit, and the air conditioning unit that are linked with the battery module, from which the request for cooling of the battery module is not input, so that the refrigerant circulates back to the compressor from the compressor through the external heat exchanger, the third expansion valve, and the chiller and that the coolant circulates along the coolant line.

In the vehicle control system into which battery temperature management and air conditioning are integrated according to an exemplary embodiment of the present disclosure, which has the configuration as described above, the coolant in the battery temperature management system and the refrigerant in the air conditioning system can exchange heat with each other. Thus, the performance of each of the battery temperature management system and the air conditioning system may be improved without increasing the capacity of each the battery temperature management system and the air conditioning system.

The performance of each of the battery temperature management system and the air conditioning system may be improved without increasing the sizes thereof. Thus, the weight of the vehicle and the manufacturing cost may be reduced.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

Figure 1:
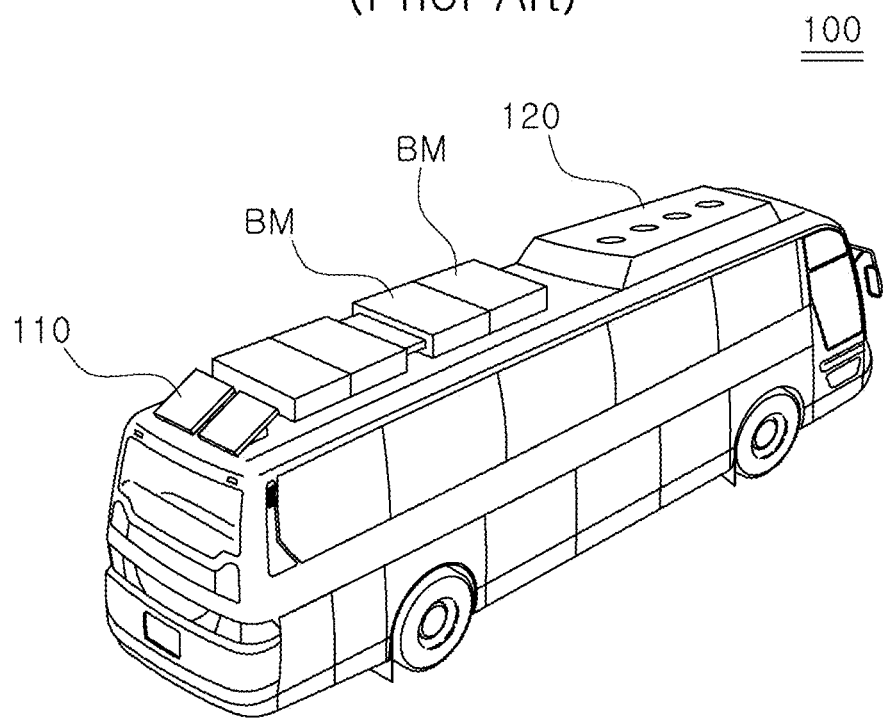
FIG. 1 is a perspective view exemplarily illustrating a state where a battery and an air conditioner are independently provided in a roof of a vehicle in the related art.

It may be understood that the appended drawings are not necessarily to scale, presenting a somewhat simplified representation of various features illustrative of the basic principles of the present disclosure. The specific design features of the present disclosure as included herein, including, for example, specific dimensions, orientations, locations, and shapes will be determined in part by the particularly intended application and use environment.

In the figures, reference numbers refer to the same or equivalent parts of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

A vehicle control system into which battery temperature management and air conditioning are integrated according to an exemplary embodiment of the present disclosure will be described in detail below with reference to the accompanying drawings.

The vehicle control system into which battery temperature management and air conditioning control are integrated according to an exemplary embodiment of the present disclosure includes: a battery temperature management unit 10 that sets a temperature of a battery module BM provided in a vehicle to be in a predetermined range, by circulating a coolant to the battery module; an air conditioning unit 20 that operates as an air conditioner or a heat pump according to a circulation direction of a refrigerant; a heat exchange unit 30 that causes the coolant and the refrigerant to exchange heat with each other; and a controller 40 that is configured to perform control so that the battery temperature management unit 10 operates, that the air conditioning unit 20 operates as the air conditioner or the heat pump according to a request for cooling air inside of the vehicle or heating of the air inside of the vehicle, and that the heat exchange unit 30 selectively absorbs heat of the refrigerant.

The battery temperature management unit 10 keeps the battery module BM at an appropriate temperature by circulating the coolant to the battery module BM provided in the vehicle.

Normally, heat is generated in the battery module BM during charging or discharging. When a temperature of the battery module BM is raised, the cooled coolant is supplied to the battery module BM, and thus the battery module BM is kept at an appropriate temperature. Furthermore, when a temperature of outside air is too low, the coolant of which a temperature is raised is supplied to the battery module BM. Thus, the temperature of the battery module BM is raised to an appropriate temperature. Accordingly, the battery module BM is set to operate efficiently.

The battery module BM is manufactured by stacking battery cells B on top of each other. According to an output or the like required by the vehicle, a plurality of battery modules BM may be provided to meet a required capacity of the vehicle. FIG. 2, FIG. 3, FIG. 4, FIG. 5, FIG. 6, FIG. 7, FIG. 8, and FIG. 9 illustrate an example where two battery modules BM are provided.

A constituent element of the battery temperature management unit 10 is provided on a close-loop coolant line C which passes through the battery module BM and inside which the coolant flows. The constituent element may be configured to keep the battery module BM at an appropriate temperature.

As many coolant lines C as the number of battery modules BM are provided and thus temperatures of the battery modules BM are controlled independently of each other. The reason for this is to easily manage the temperature of the battery module BM when a temperature deviation occurs between the battery modules BM or where any one of the battery modules BM needs a greater cooling load.

The coolant is stored in a coolant tank 11. The coolant tank 11 supplies the coolant to the coolant line C.

A radiator 12 is provided so that the coolant line C passes through it. The radiator 12 radiates heat of the coolant. A fan for facilitating the present heat radiation is provided on one side of the radiator 12.

A pump 13 circulates the coolant along the coolant line C.

A three-way valve 14 is provided on the coolant line C and the three-way valve 14 is configured to perform control so that the coolant flows through the radiator 12 or bypasses the radiator 12. When a temperature of the coolant is sufficiently low to cool the battery module BM or where the temperature of outside air is too high and thus the coolant absorbs heat in the radiator 12, the three-way valve 14 allows the coolant to bypass the radiator 12. Furthermore, when the temperature of outside air is lower than the temperature of the coolant and the coolant needs to be sufficiently cooled, the three-way valve 14 allows the coolant to flow through the radiator 12.

A heater 31 and a chiller 32 of the heat exchange unit 30 described below are also provided on the coolant line C.

Accordingly, the coolant circulates back to the pump 13 through the pump 13, the chiller 32, the heater 31, the battery module BM, and the three-way valve 14. Furthermore, the coolant flows through the three-way valve 14 and then circulates back to the pump 13 through the radiator 12.

Accordingly, heat generated in the battery module BM is absorbed by the coolant, and the coolant is cooled in the radiator 12 or the chiller 32. Thus, the coolant is kept at an appropriate temperature.

The air conditioning unit 20 includes a plurality of air conditioning lines A1, A2, and A3 along which the refrigerant flows. The air conditioning unit 20 circulates the refrigerant along the air conditioning lines A1, A2, and A3, cooling or heating the air inside of the vehicle.

The air conditioning unit 20 includes the first air conditioning line A1 along which the refrigerant circulates and which operates in an air conditioning mode or a heat pump mode. A compressor 21 that pressurizes the refrigerant, an external heat exchanger 22, an internal heat exchanger 23, and a direction switching valve 27 are provided on the first air conditioning line A1. The external heat exchanger 22 and the internal heat exchanger 23 are provided outside of and inside of, respectively, the vehicle. The external heat exchanger 22 exchanges heat with outside air, and the internal heat exchanger 23 exchanges heat with the air inside of the vehicle.

The direction switching valve 27 is a four-way valve. The direction switching valve 27 is provided adjacent to the compressor 21. Both end portions of the first air conditioning line A1 are connected to the direction switching valve 27. Thus, the direction switching valve 27 switches between circulation directions of the refrigerant so that the air conditioning unit 20 operates in the air conditioning mode for cooling or operates in the heat pump mode for heating.

A first expansion valve 24 and a second expansion valve 25 are sequentially provided, from the external heat exchanger 22 toward the internal heat exchanger 23, between the external heat exchanger 22 and the internal heat exchanger 23 on the first air conditioning line A1. A first path control valve 28a is provided between the first expansion valve 24 and the second expansion valve 25 on the first air conditioning line A1.

The direction switching valve 27 switches between directions of the refrigerant discharged from the compressor 21 so that the air conditioning unit 20 is set to operate in the air conditioning mode or operates in the heat pump mode.

The second air conditioning line A2 is provided to branch off from the first air conditioning line A1 and to pass through the chiller 32. The internal heat exchanger 23 and the chiller 32 are set to be arranged in parallel on the second air conditioning line A2. The second air conditioning line A2 branches off from between the first path control valve 28a and the second expansion valve 25 on the first air conditioning line A1, passes through the chiller 32, and then joins the first air conditioning line A1 between the internal heat exchanger 23 and the direction switching valve 27.

A third expansion valve 26 is provided between a point where the second air conditioning line A2 branches off from the first air conditioning line A1 and the chiller 32. A second path control valve 28b is provided between the chiller 32 and a point where the second air conditioning line A2 joins the first air conditioning line A1.

The third air conditioning line A3 is provided so that the first air conditioning line A1 and the second air conditioning line A2 are connected to each other. When the air conditioning unit 20 operates as the heat pump, the third air conditioning line A3 forms a path for the refrigerant. The third air conditioning line A3 connects between a point on the first air conditioning line A1 between the direction switching valve 27 and the external heat exchanger 22 and a point on the second air conditioning line A2 between the chiller 32 and the second path control valve 28b. A third path control valve 28c is provided on the third air conditioning line A3. When the air conditioning unit 20 operates in the air conditioning mode, the third path control valve 28c is closed. When the air conditioning unit 20 operates as the heat pump, the third path control valve 28c is open.

The heat exchange unit 30 causes the coolant in the battery temperature management unit 10 and the refrigerant in the air conditioning unit 20 to exchange heat with each other.

The heat exchange unit 30 includes the heater 31 that raises the temperature of the coolant and the chiller 32 that causes the coolant and the refrigerant to exchange heat with each other.

The heater 31 operates on electric power of the battery module BM. The heater 31, when a control signal for operation is applied to it, generates heat and raises the temperature of the coolant flowing through the heater 31. When the temperature of the battery module BM is too low and thus where the battery module BM does not achieve appropriate performance, the heater 31 is caused to operate and thus the temperature of the battery module BM is raised to an appropriate temperature. Alternatively, heat of the heater 31 is transferred to the refrigerant through the chiller 32, and thus driving of the compressor 21 is set to be assisted, when the compressor 21 is impossible to drive because pressure of the refrigerant is too low when the compressor 21 is driven to cause the air conditioning unit 20 to operate as the heat pump.

The chiller 32 causes the coolant and the refrigerant to exchange heat with each other. The coolant line C and the second air conditioning line A2 pass through the chiller 32. Thus, the coolant and the refrigerant exchange heat with each other inside of the chiller 32. For example, in the chiller 32, the refrigerant absorbs the heat of the coolant.

Figure 2:
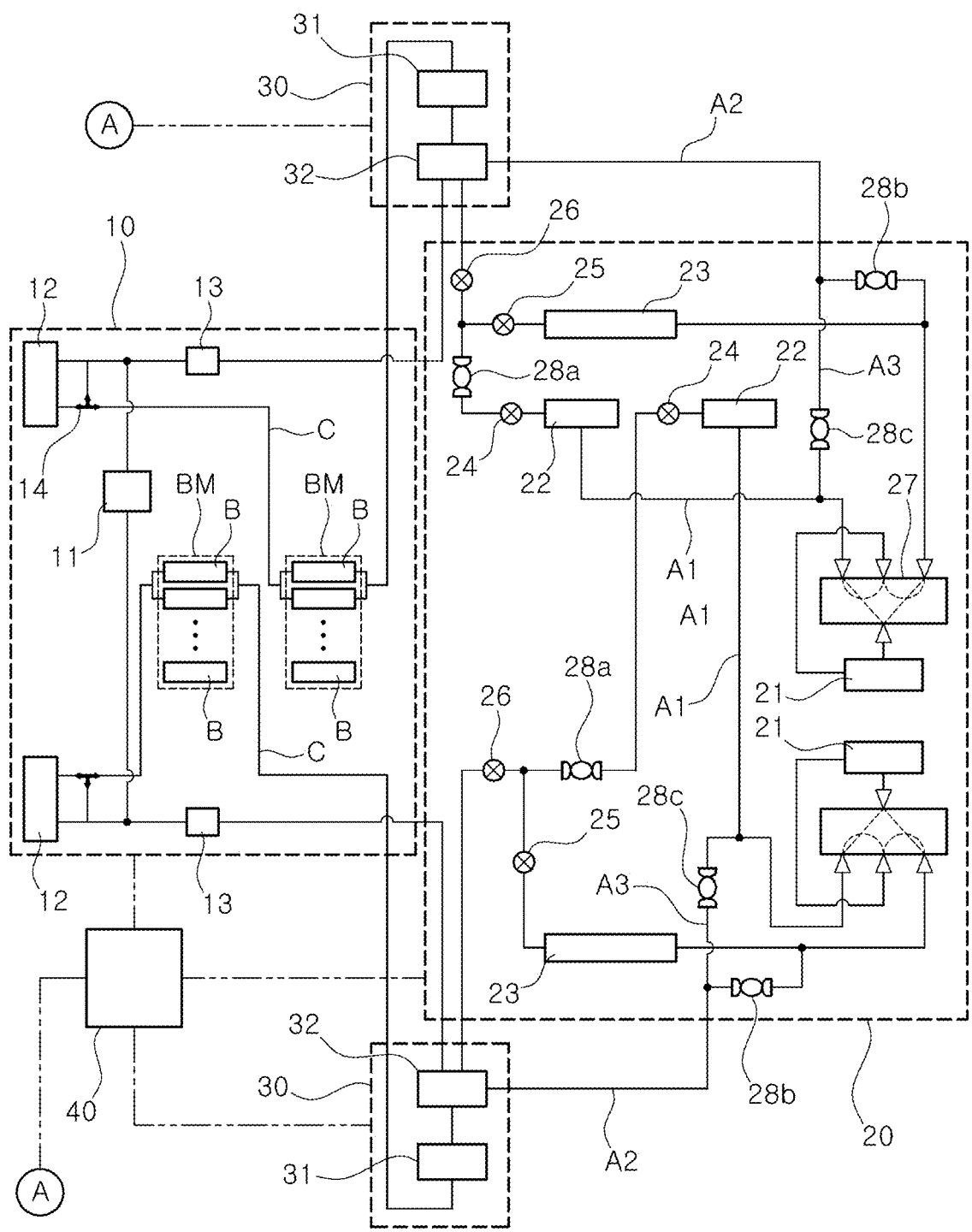
FIG. 2 is a schematic view exemplarily illustrating a vehicle control system into which battery temperature management and air conditioning are integrated according to an exemplary embodiment of the present disclosure.

The plurality of battery modules BM are provided. As many air conditioning units 20 and as many heat exchange units 30 as the number of battery modules BM are also configured to be correspondingly provided. The plurality of battery modules BM are provided. Accordingly, as many coolant line C as the number of battery modules BM are provided on the battery temperature management unit 10. The pump 13, the radiator 12, and the three-way valve 14 are provided on each of the coolant lines C so that the temperature of each of the battery modules BM is set to be managed. Furthermore, the heat exchange unit 30 is provided on each of the coolant lines C. Furthermore, the air conditioning unit 20 is connected to each of the heat exchange units 30 so that the refrigerant independently circulates therethrough. FIG. 2 illustrates that air conditioning lines A1, A2 and A3 which may operate independently of each other are provided in the air conditioning unit 20. Accordingly, a predetermined battery module BM may be controlled in a different manner than the other battery modules BM. For example, when a temperature of one battery module BM is higher than a temperature of each of the other battery modules BM, the air conditioning unit 20 connected to the battery module BM at a high temperature cools the refrigerant. Thus, the coolant is set to be supplied to the battery module BM in a state of being cooled by the refrigerant.

The controller 40 is configured to control the battery temperature management unit 10, the air conditioning unit 20, and the heat exchange unit 30 according to a temperature of outside air, the temperature of the battery module BM, the request for cooling of the air inside of the vehicle, and the request for heating of the air inside of the vehicle.

At the present point, the request for cooling of the air inside of the vehicle is made when it is necessary to cool the air inside of the vehicle, such as when a button for operating an air conditioner is operated from the inside of the vehicle or when a temperature of the air inside of the vehicle is raised to above a preset temperature. Furthermore, the request for heating of the air inside of the vehicle is made when it is necessary to warm the air inside of the vehicle, such as when a button for operating the heater 31 is operated from the inside of the vehicle or when the temperature of the air inside of the vehicle is lowered to below the preset temperature.

According to a predetermined condition, the controller 40 is configured to control the vehicle control system into which battery temperature management and air conditioning according are integrated so that it operates in a mode for cooling the air inside of the vehicle or in a mode for heating the air inside of the vehicle and raising the temperature of the battery, these two modes being described below.

Output values of various sensors or an output value of an operational switch is input into the controller 40. According to a logic which is stored in the controller 40, the controller 40 is configured to control the vehicle control system into which battery temperature management and air conditioning are integrated.

The controller 40 causes the coolant to circulate by controlling the pump 13 of the battery temperature management unit 10 and causes the coolant to bypass or flow through the radiator 12 by controlling the three-way valve 14.

Furthermore, when the controller 40 needs to operate the compressor 21 in the air conditioning unit 20 and thus to cause the air conditioning unit 20 to operates, the controller 40 causes the refrigerant to be compressed and discharged. Furthermore, according to an operational mode, the controller 40 opens or closes the first path control valve 28a, the second path control valve 28b, and the third path control valve 28c and is configured to control the circulation direction of the refrigerant so that the refrigerant circulates to the direction switching valve 27, forming a path along which the refrigerant circulates. Accordingly, the controller 40 is also configured to control the first expansion valve 24, the second expansion valve 25, and the third expansion valve 26 so that they are in an open, closed, or expanded state.

Furthermore, the controller 40 applies a control signal for operation to the heater 31 in the heat exchange unit 30 and causes the heater 31 to operate.

Operation of the vehicle control system into which battery temperature management and air conditioning are integrated according to an exemplary embodiment of the present disclosure, which includes the configuration as described above, will be described below with reference to FIG. 3, FIG. 4, FIG. 5, FIG. 6, FIG. 7, FIG. 8, and FIG. 9.

FIG. 3, FIG. 4, FIG. 5, FIG. 6, FIG. 7, FIG. 8, and FIG. 9 illustrate a state where the vehicle control system into which battery temperature management and air conditioning are integrated according to an exemplary embodiment of the present disclosure operates in each operational mode.

In the battery temperature management unit 10, the coolant circulates in a predetermined direction thereof. According to the operational mode, the coolant circulates in a state of being naturally cooled in the chiller 32 or circulates in a state of being cooled by the refrigerant in the chiller 32.

In the air conditioning unit 20, the first path control valve 28a, the second path control valve 28b, and the third path control valve 28c are open or closed so that each operational mode is entered. In FIG. 3, FIG. 4, FIG. 5, FIG. 6, FIG. 7, FIG. 8, and FIG. 9, the first path control valve 28a, the second path control valve 28b, and the third path control valve 28c, when in an open state and in a closed state, are depicted by a box colored in white and a box colored in black, respectively.

Furthermore, according to each operational mode, the first expansion valve 24, the second expansion valve 25, or the third expansion valve 26 is open or closed so that it simply opens or close the path. When expansion of the refrigerant is necessary, the first expansion valve 24, the second expansion valve 25, or the third expansion valve 26 operates as an expansion valve. According to the operational mode, the first expansion valve 24, the second expansion valve 25, or the third expansion valve 26 may be in any of the states. For example, when the refrigerant does not flow through the first expansion valve 24 in a second mode for heating the air inside of the vehicle and in the mode for heating the air inside of the vehicle and raising the temperature of the battery, the first expansion valve 24 may be in any of the states.

Furthermore, when temperatures of the external heat exchanger 22, the internal heat exchanger 23, the chiller 32, and the heater 31 are raised, they are marked with "(H),", and when the temperatures thereof are lowered, they are marked with "(C)." The capital letters "(H)" and "(C)" in parentheses depict a state where the temperature of the corresponding constituent element is raised and a state where the corresponding constituent element is cooled, respectively. The same corresponding constituent elements, although marked with the same letter, may not have the same temperature.

1) Mode for Cooling the Air Inside of the Vehicle

Figure 3:
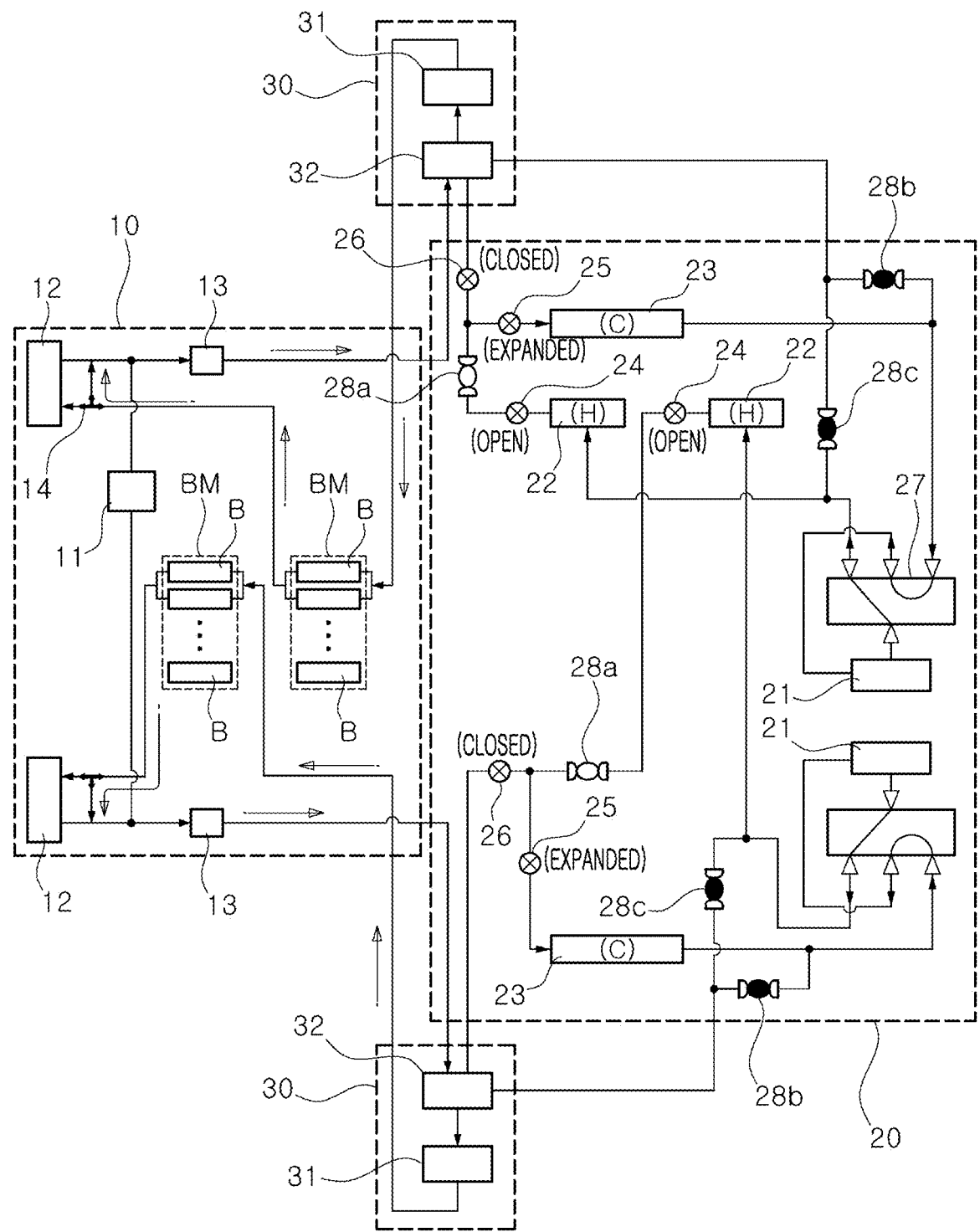
FIG. 3 is a schematic view exemplarily illustrating a state where the vehicle control system into which battery temperature management and air conditioning are integrated according to an exemplary embodiment of the present disclosure operates in a mode for cooling air inside of a vehicle.
Figure 4:
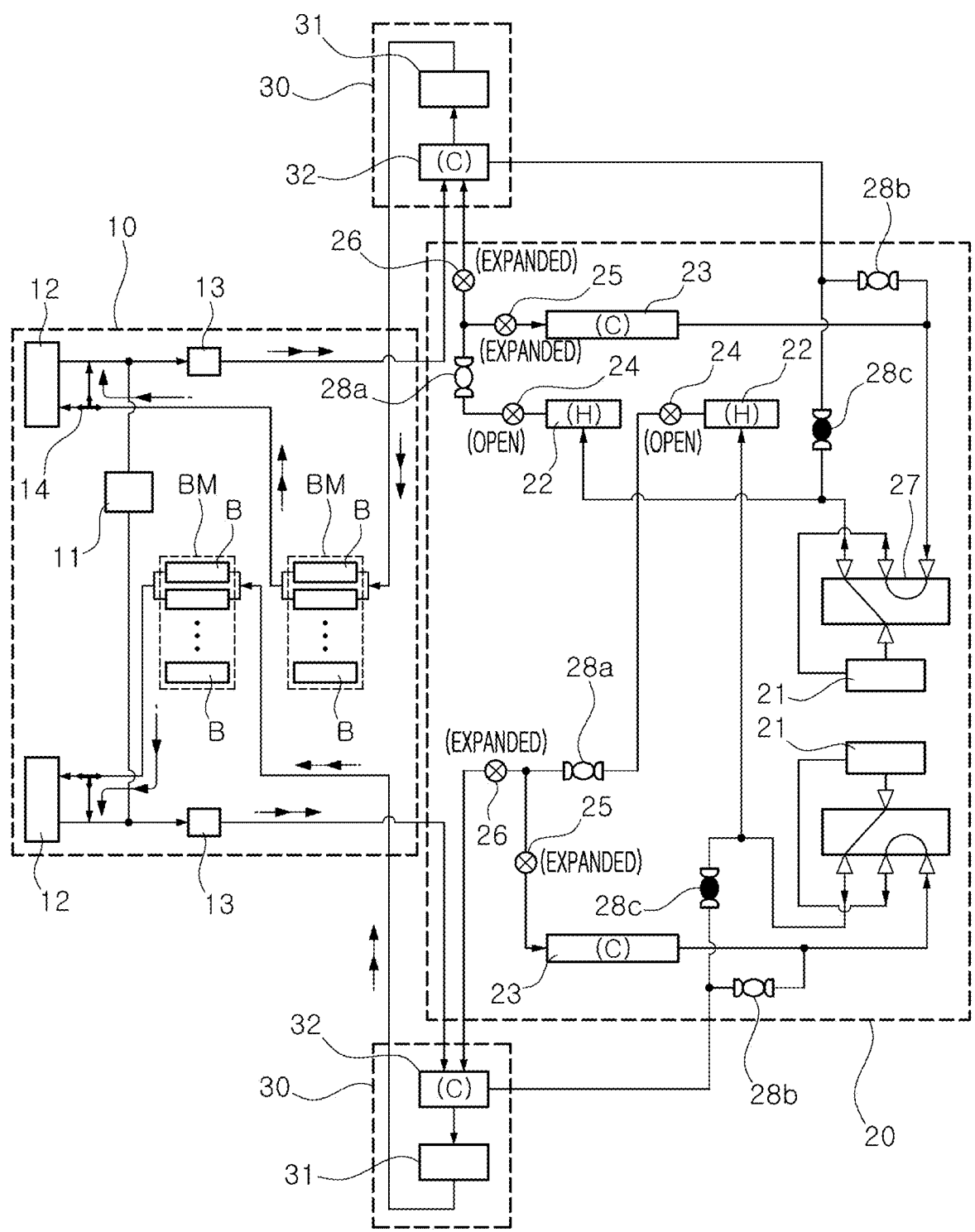
FIG. 4 is a schematic view exemplarily illustrating a state where the vehicle control system into which battery temperature management and air conditioning are integrated according to an exemplary embodiment of the present disclosure operates in a mode for cooling the air inside of the vehicle and integrally cooling a battery.
Figure 5:
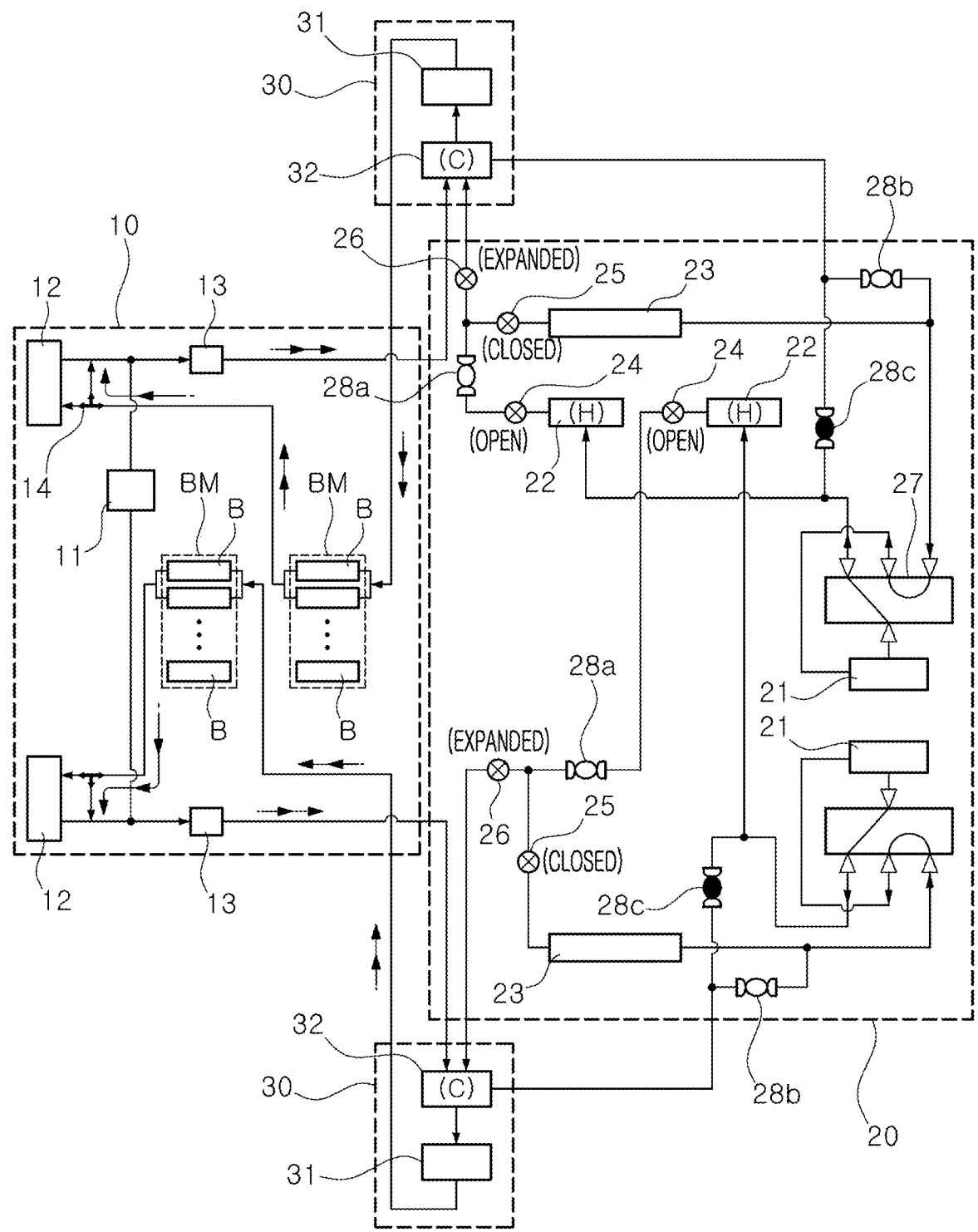
FIG. 5 is a schematic view exemplarily illustrating a state where the vehicle control system into which battery temperature management and air conditioning are integrated according to an exemplary embodiment of the present disclosure operates in a battery cooling mode.

In a state where only with the coolant, it is possible to cool the battery module BM, when the request for cooling of the air inside of the vehicle is made from the inside of the vehicle, the mode for cooling the air inside of the vehicle is entered (refer to FIG. 3).

The state where only with the coolant, it is possible to cool the battery module BM refers to a state where the battery module BM may be kept in a predetermined temperature range only by the coolant flowing through the radiator 12 or the chiller 32 from the battery module BM.

In the present state, when the request for cooling of the air inside of the vehicle is made from the inside of the vehicle, the mode for cooling the air inside of the vehicle is entered.

In the mode for cooling the air inside of the vehicle, the battery temperature management unit 10 is configured to control the temperature of the battery module BM using the pump 13. When the pump 13 is driven, the coolant is discharged from the pump 13 and circulates back to the pump 13 through the chiller 32, the battery module BM, and the three-way valve 14. Alternatively, when the temperature of the coolant is higher than the temperature of the battery module BM, but lower than the temperature of outside air, the coolant is discharged from the pump 13 and circulates back to the pump 13 through the chiller 32, the battery module BM, the three-way valve 14, and the radiator 12. The battery temperature management unit 10 naturally cools the coolant using outside air and circulates the cooled coolant, and thus cools the battery module BM.

The controller 40 is configured to control the air conditioning unit 20 so that it discharges the compressed refrigerant from the compressor 21 in the mode for cooling the air inside of the vehicle.

The controller 40 is configured to perform control so that the refrigerant circulates back to the compressor 21 from the compressor 21 through the external heat exchanger 22, the second expansion valve 25, the internal heat exchanger 23, and the direction switching valve 27 in the air conditioning unit 20, and that the refrigerant is expanded in the second expansion valve 25. To the present end, the controller 40 opens the first expansion valve 24 and closes the third expansion valve 26, and opens the first path control valve 28a and closes the second path control valve 28b and the third path control valve 28c. In the instant state, when the compressor 21 is caused to operate, the external heat exchanger 22 operates as a condenser, and the internal heat exchanger 23 operates as an evaporator. Therefore, the air inside of the vehicle may be cooled.

2) Mode for Cooling the Air Inside of the Vehicle and Integrally Cooling A Battery When the request for cooling of the air inside of the vehicle is made from the inside of the vehicle and where a battery cooling request for cooling of the battery module BM is made, the mode for cooling the air inside of the vehicle and integrally cooling the battery is entered.

Here, the battery cooling request is made when the temperature of the battery module BM or the temperature of the coolant that flows through the battery module BM and circulates is higher than a preset temperature and thus the battery module BM needs to be cooled.

The mode for cooling the air inside of the vehicle and integrally cooling the battery is entered when the battery cooling request for cooling of all the battery modules BM is made.

In a summer season, the cooling of the air inside of the vehicle is necessary because the request for cooling of the air inside of the vehicle is made. Electric power is supplied to a drive motor configured for driving and thus heat is generated in the battery module BM. Moreover, the temperature of outside air is high in the summer season, and thus the performance of heat radiation through the chiller 32 and the radiator 12 is decreased. Because of this, the coolant needs to be additionally cooled. In the present manner, when the request for cooling of the air inside of the vehicle is made from the inside of the vehicle and the battery module BM needs to be cooled, the mode for cooling the air inside of the vehicle and integrally cooling the battery is entered.

The controller 40 is configured to control the battery temperature management unit 10 in the same manner as in the mode for cooling the air inside of the vehicle that described above. That is, the pump 13 circulate the coolant so that it flows into the pump 13, the chiller 32, the heater 31, and the battery module BM. Moreover, the pump 13 operates so that the coolant discharged from the battery module BM circulates back to the pump 13 through the three-way valve 14 or circulates back to the pump 13 through the three-way valve 14 and the radiator 12. Because the battery module BM needs to be cooled, the heater 31 does not operate.

The controller 40 causes both the air conditioning unit 20 and the heat exchange unit 30 to cool the inside of the vehicle and the chiller 32 through the refrigerant. The controller 40 causes the refrigerant to circulate back to the compressor 21 from the compressor 21, through the external heat exchanger 22, the second expansion valve 25, the internal heat exchanger 23, and the direction switching valve 27. The controller 40 causes the refrigerant to be expanded in the second expansion valve 25.

Furthermore, the controller 40 causes the refrigerant to flow from the compressor 21 to the third expansion valve 26 through the direction switching valve 27 and the external heat exchanger 22 and then to circulate back to the compressor 21 through the chiller 32 of the heat exchange unit 30. The controller 40 causes the refrigerant to be expanded in the third expansion valve 26.

To the present end, the controller 40 opens the first expansion valve 24, and opens the first path control valve 28a and the second path control valve 28b and closes the third path control valve 28c.

As the compressor 21 operates, the external heat exchanger 22 operates as a condenser, and the internal heat exchanger 23 and the chiller 32 each operate as an evaporator. Cold air is supplied to the inside of the vehicle through the internal heat exchanger 23, and thus the air inside of the vehicle may be cooled. Furthermore, the chiller 32 absorbs the heat of the coolant that flows through the chiller 32, and thus facilitates the cooling of the battery module BM.

3) Battery Cooling Mode

Much heat is generated in the battery module BM during the charging. When the battery cooling request is made to improve charging efficiency and prevent battery deterioration, the battery cooling mode for cooling the battery module BM may be entered (refer to FIG. 4).

Normally, the battery module BM is in a state of being charged when a passenger does not ride in the vehicle. Therefore, in the battery cooling mode, the cooling capacity of the air conditioning unit 20 for cooling the air inside of the vehicle is set to be allocated to cool the battery module BM.

The controller 40 operates the pump 13 so that the coolant circulates in the battery temperature management unit 10. The coolant flows through the pump 13, the chiller 32, the heater 31 and the battery module BM. The coolant flowing through the battery module BM circulates back to the pump 13 just from the three-way valve 14 or circulates back to the pump 13 from the three-way valve 14 through the radiator 12. At the present point, the battery module BM needs to be cooled, and therefore, the heater 31 does not operate and the chiller 32, as described below, is cooled by the refrigerant. Thus, the coolant flowing through the chiller 32 is cooled, and the coolant at a low temperature is supplied to the battery module BM.

The controller 40 causes the air conditioning unit 20 and the heat exchange unit 30 to cool the coolant. The controller 40 causes the refrigerant to flow from the compressor 21 to the third expansion valve 26 through the direction switching valve 27 and the external heat exchanger 22 in the air conditioning unit 20 and then to circulate to the compressor 21 through the chiller 32 of the heat exchange unit 30. The controller 40 causes the refrigerant to be expanded in the third expansion valve 26. To the present end, the controller 40 opens the first expansion valve 24 and closes the second expansion valve 25. Furthermore, the controller 40 opens the first path control valve 28a and the second path control valve 28b and closes the third path control valve 28c.

A refrigeration cycle is formed in which the refrigerant circulates back to the compressor 21 from the compressor 21, through the external heat exchanger 22, the third expansion valve 26, and the chiller 32. Accordingly, the external heat exchanger 22 is configured as a condenser, and the chiller 32 is configured as an evaporator. The cooled chiller 32 absorbs the heat of the coolant and facilitates the cooling of the battery module BM.

In the battery cooling mode, to radiate much heat generated in the battery module BM, the pump 13 is caused to operate so that increases an output thereof, and the coolant is caused to flow through the chiller 32.

4) Mode for Cooling the Air Inside of the Vehicle and Individually Cooling the Battery A necessary cooling load may also vary according to a load to each of the battery modules BM that are mounted in the vehicle. Each of the battery modules BM supplies electric power to the drive motor necessary to drive the vehicle, and additionally supplies electric power necessary for operation to various devices of the vehicle. The electric power which is supplied to the various devices of the vehicle may be supplied from one or several of the plurality of battery modules BM, and thus the battery modules BM may have their respective different electric power loads. Among the battery modules BM, the battery module that has a great electric power load may also have a great cooling load. For example, the battery module BM that supplies electric power to the air conditioning unit 20 in the summer season has a great electric power load, and thus may have a relatively higher temperature than the other battery modules BM.

When the battery modules had their respective different cooling loads as described above, the battery modules BM may be cooled individually. That is, the coolant which is much cooled is set to be supplied through the chiller 32 to the battery module BM including a great cooling load, and the battery module BM that does not include a great cooling load is set to be supplied the coolant that exchanged heat with outside air (refer to FIG. 6).

Figure 6:
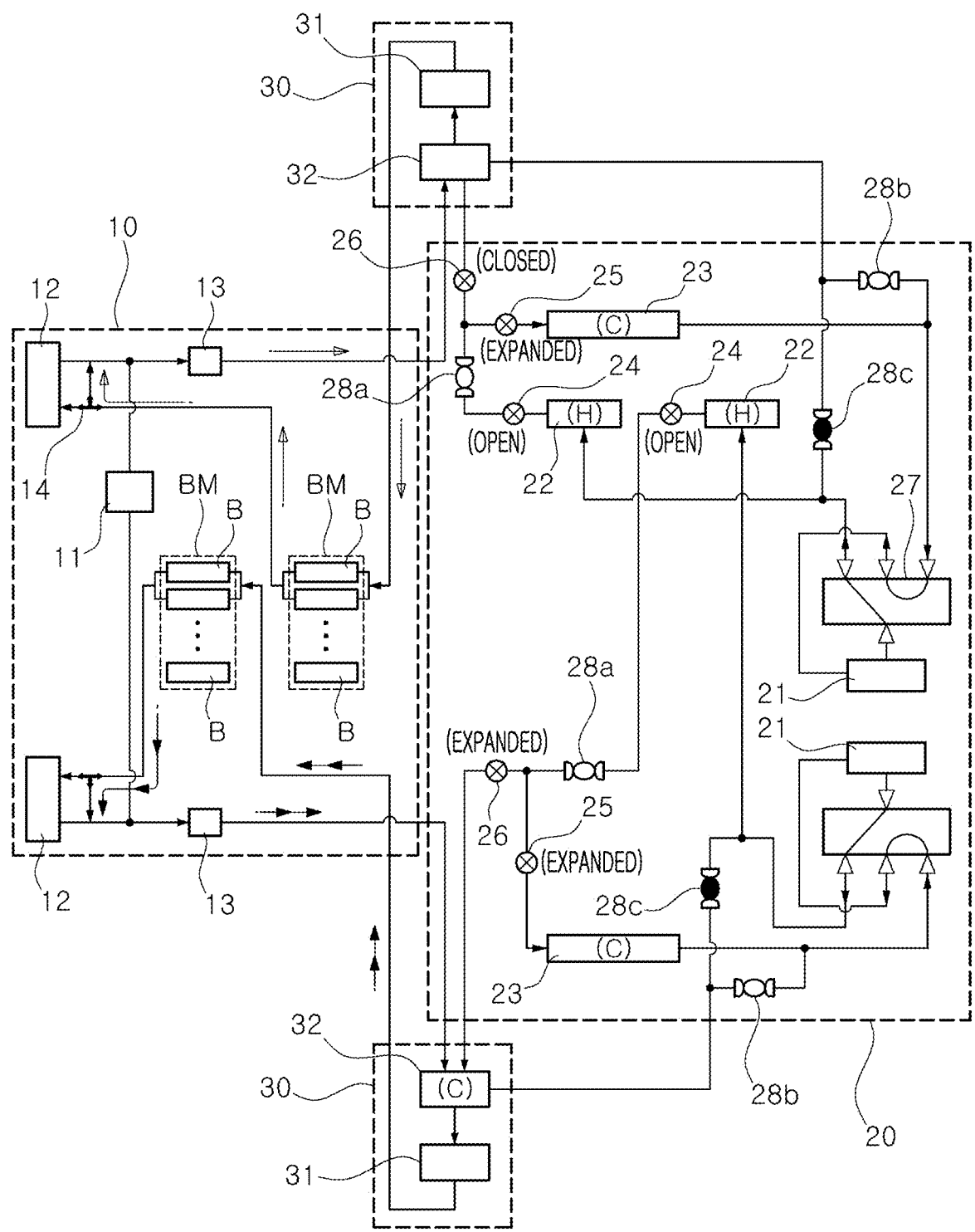
FIG. 6 is a schematic view exemplarily illustrating a state where the vehicle control system into which battery temperature management and air conditioning are integrated according to an exemplary embodiment of the present disclosure operates in a mode for cooling the air inside of the vehicle and individually cooling the battery.

When the battery module BM illustrated on the left side of FIG. 6 has a high temperature and thus has a greater cooling load than the battery module BM illustrated on the right side thereof, the coolant cooled in the chiller 32 is set to be supplied to the battery module BM illustrated on the left side thereof, and the coolant naturally cooled using outside air is set to be supplied to the battery module BM illustrated on the right side thereof.

That is, the air conditioning unit 20 linked with a constituent element of the battery temperature management unit 10 for supplying the coolant to the battery module BM illustrated on the right side of FIG. 6, and the battery temperature management unit 10 operate in the same manner as in the mode for cooling the air inside of the vehicle and integrally cooling the battery. Thus, the coolant cooled with the refrigerant in the chiller 32 is set to flow into the battery module BM.

The air conditioning unit 20 linked with a constituent element of the battery temperature management unit 10 for supplying the coolant to the battery module BM illustrated on the right side of FIG. 6, and the battery temperature management unit 10 operate in the same manner as in the mode for cooling the air inside of the vehicle. Thus, the coolant cooled naturally by exchanging heat with outside air in the chiller 32 is set to flow into the battery module BM.

In the mode for cooling the air inside of the vehicle and integrally cooling the battery, the controller 40 individually is configured to control constituent elements of each of the air conditioning unit 20 and the heat exchange unit 30. That is, two independent refrigerant circuits in each of the air conditioning unit 20 and the heat exchange unit 30 are illustrated, and the refrigerant circuits are controlled so that they operate differently according to which battery module is associated therewith.

5) First Mode for Heating the Air Inside of the Vehicle

Figure 7:
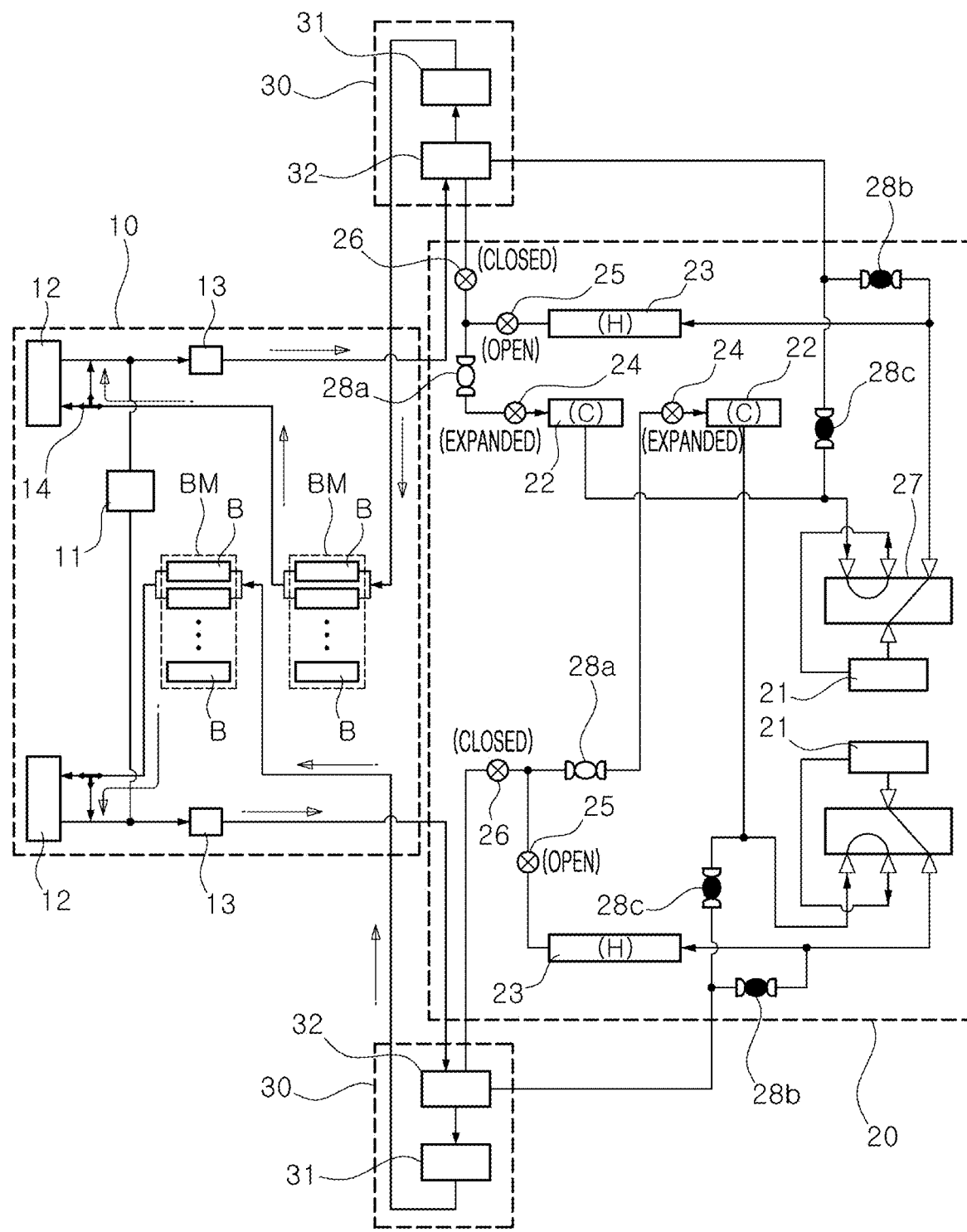
FIG. 7 is a schematic view exemplarily illustrating a state where the vehicle control system into which battery temperature management and air conditioning are integrated according to an exemplary embodiment of the present disclosure operates in a first mode for heating the air inside of the vehicle.
Figure 8:
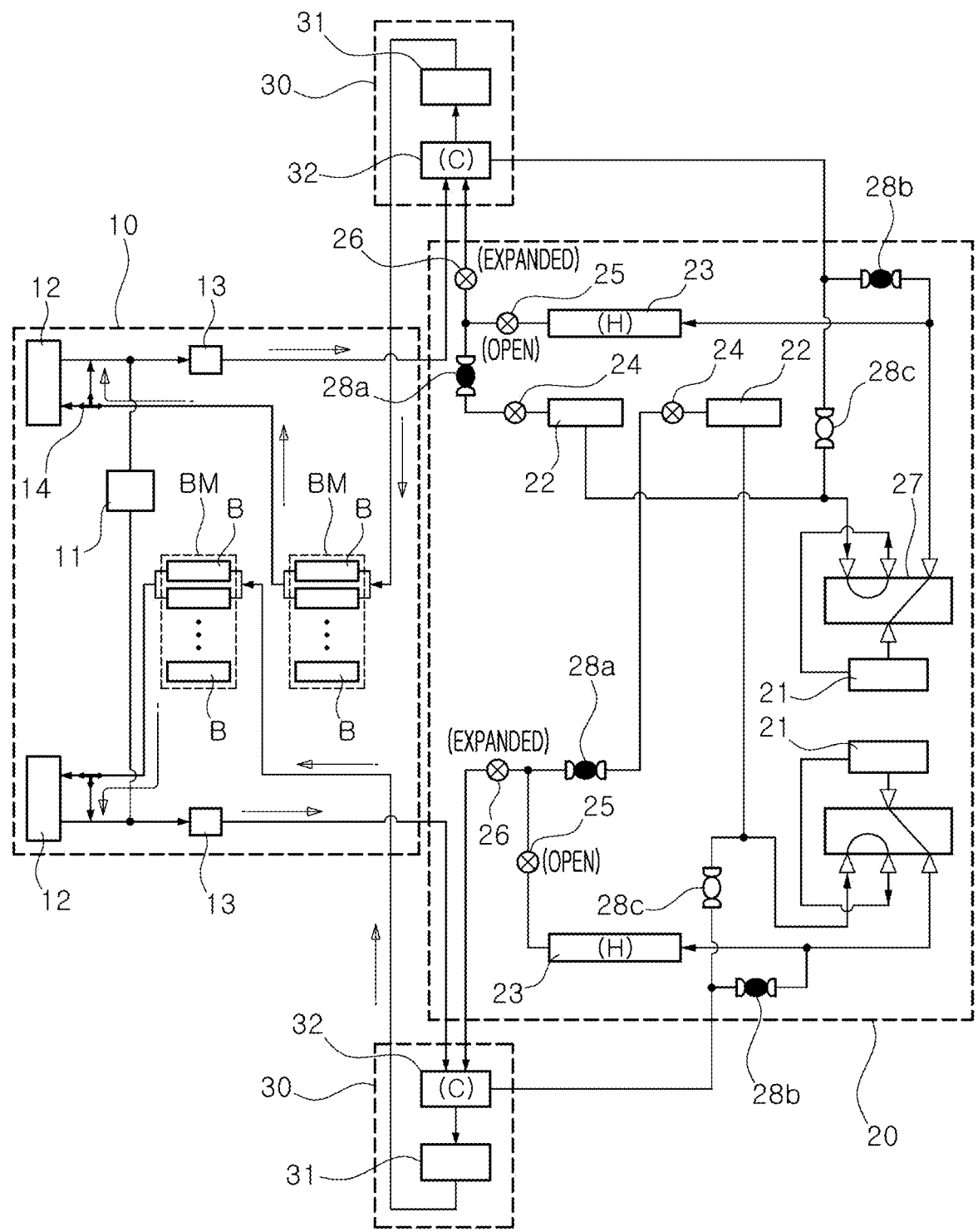
FIG. 8 is a schematic view exemplarily illustrating a state where the vehicle control system into which battery temperature management and air conditioning are integrated according to an exemplary embodiment of the present disclosure operates in a second mode for heating the air inside of the vehicle.
Figure 9:
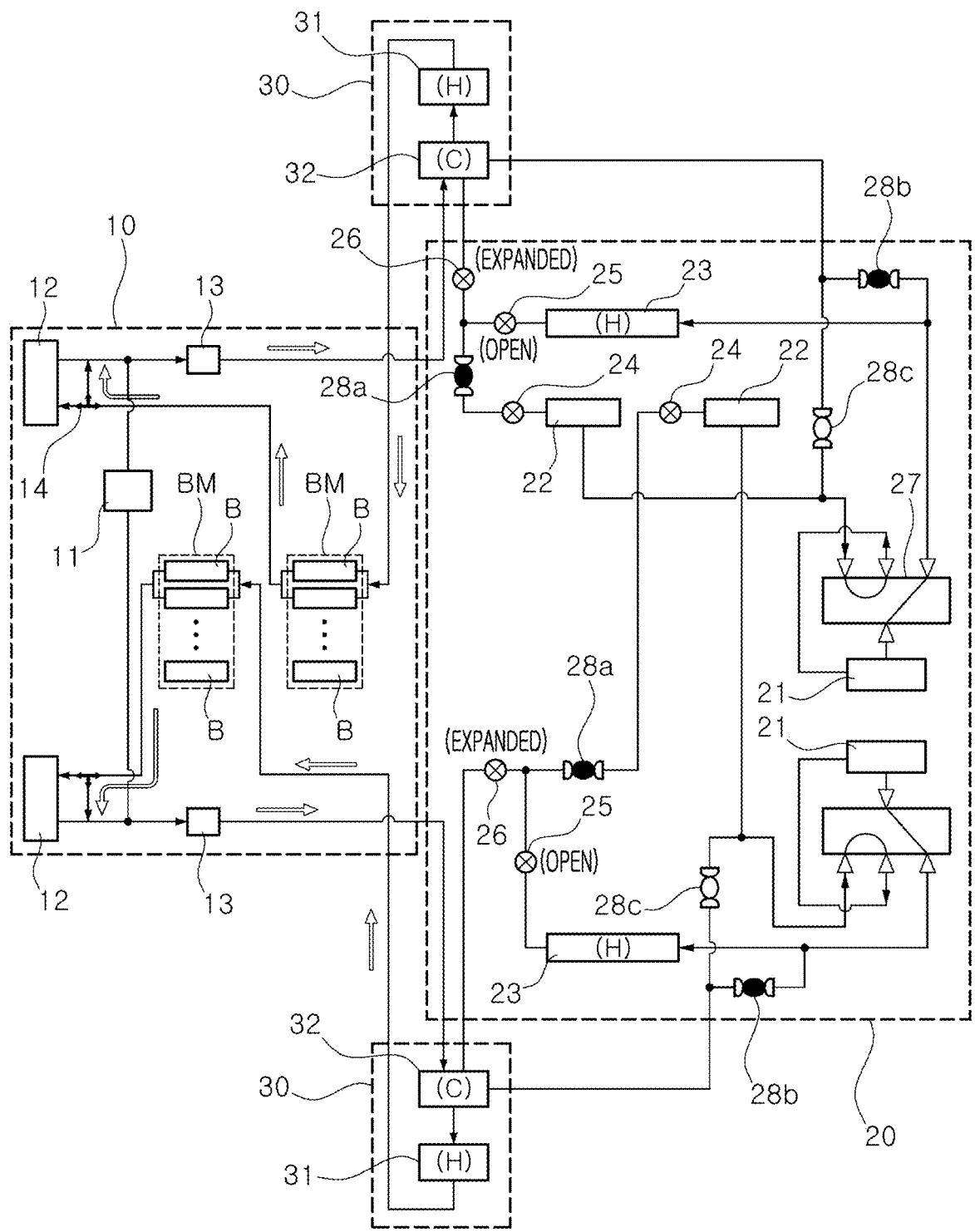
FIG. 9 is a schematic view exemplarily illustrating a state where the vehicle control system into which battery temperature management and air conditioning are integrated according to an exemplary embodiment of the present disclosure operates in a mode for heating the air inside of the vehicle and raising a temperature of the battery.

When the request of heating of the air inside of the vehicle is made from the inside of the vehicle, such as when the air inside of the vehicle needs to be heated in a winter season, the first mode for heating the air inside of the vehicle is entered for the air conditioning unit 20 to operate as the heat pump (refer to FIG. 7).

When a heating load is not very great in the winter season (for example, in a case where, at a temperature of 5° C. or higher, the air inside of the vehicle needs to be heated), the air conditioning unit 20 operates as the heat pump.

The battery temperature management unit 10 is controlled in the same manner as when the battery module BM is usually cooled. That is, like in the battery cooling mode, the battery temperature management unit 10 is controlled so that the coolant circulates.

The controller 40 causes the refrigerant to be discharged from the compressor 21 and then to circulate back to the compressor 21 through the direction switching valve 27, the internal heat exchanger 23, the first expansion valve 24, and the external heat exchanger 22 so that the air conditioning unit 20 operates as the heat pump. The controller 40 causes the refrigerant to be expanded in the first expansion valve 24.

To the present end, the controller 40 opens the second expansion valve 25, closes the third expansion valve 26, opens the first path control valve 28a, and closes the second path control valve 28b and the third path control valve 28c.

Accordingly, the internal heat exchanger 23 operates as a condenser, and the external heat exchanger 22 operates as an evaporator. Thus, the heat of the refrigerant is radiated in the internal heat exchanger 23, and thus the air inside of the vehicle is heated.

Even though in the winter season, the first mode for heating the air inside of the vehicle is entered when the temperature of outside air is the same as or higher than a temperature at which the external heat exchanger 22 operates as an evaporator.

6) Second Mode for Heating the Air Inside of the Vehicle

When the request for heating of the air inside of the vehicle is made from the inside of the vehicle, the second mode for heating the air inside of the vehicle is entered for the air conditioning unit 20 and the heat exchange unit 30 to operate as the heat pump. The second mode for heating the air inside of the vehicle is entered when the temperature of outside air is lower than when the first mode for heating the air inside of the vehicle is entered. When the temperature of outside air is too low (for example, −5° C. to 5° C.), the external heat exchanger 22 does not operate as an evaporator. Although the external heat exchanger 22 operates as an evaporator, the performance thereof is reduced. Therefore, an amount of heat which is sufficient to be supplied to the inside of the vehicle is not absorbed from outside air. Therefore, the second mode for heating the air inside of the vehicle is entered to absorb heat from the coolant instead of from outside air and to supply the absorbed heat to the inside of the vehicle.

The battery temperature management unit 10 is controlled in the same manner as in the first mode for heating the air inside of the vehicle.

The controller 40 is configured to perform control so that the air conditioning unit 20 and the heat exchange unit 30 operate as the heat pump and that the refrigerant is caused to flow from the compressor 21 to the chiller 32 through the direction switching valve 27, the internal heat exchanger 23, and the third expansion valve 26 and then to circulate back to the compressor 21. The controller 40 causes the refrigerant to be expanded in the third expansion valve 26.

To the present end, the controller 40 opens the second expansion valve 25, closes the first path control valve 28*a* and the second path control valve 28*b*, and opens the third path control valve 28*c*. When the first path control valve 28*a* is closed, the refrigerant does not flow to the external heat exchanger 22 regardless of whether the first expansion valve 24 is open or closed.

Accordingly, the internal heat exchanger 23 operates as a condenser, the chiller 32 operates as an evaporator, and the external heat exchanger 22 does not operate as an evaporator. The chiller 32 absorbs the heat of the coolant and transfers the absorbed heat to the refrigerant. Thus, the chiller 32, as an evaporator, can achieve sufficient performance. The refrigerant absorbs heat in the chiller 32 and radiated the absorbed heat in the internal heat exchanger 23, and thus the air inside of the vehicle is heated.

7) Mode for Heating the Air Inside of the Vehicle and Raising the Temperature of the Battery The mode for heating the air inside of the vehicle and raising the temperature of the battery is entered when the temperature of outside air is lower than the second mode for heating the air inside of the vehicle is entered (for example, at a temperature of −5° C. or lower). In the instant state, the request for heating of the air inside of the vehicle is made from the inside of the vehicle, and a request for raising of the temperature of the battery module BM is also made from the battery module BM. When the temperature of outside air is too low, the request for raising of the temperature of the battery module BM is made to increase the pressure of the refrigerant to such a level that the compressor 21 is driven. The sufficient pressure of the refrigerant is reached by raising the temperature of the coolant in the coolant line C and thus the temperature of the battery module BM and causing the heat of the coolant to be absorbed by the refrigerant in the chiller 32.

In a state where the temperature of outside air is too low, heat is not absorbed from the coolant. Therefore, when the air conditioning unit 20 and the heat exchange unit 30 need to operate as the heat pump, a pressure of the refrigerant is initially low, and thus it is impossible to drive the compressor 21.

Accordingly, in the mode for heating the air inside of the vehicle and raising the temperature of the battery, the temperature of the coolant is raised through the heater 31 so that the compressor 21 is driven, the heat of the coolant is thus absorbed by the refrigerant, and the air conditioning unit 20 and the heat exchange unit 30 are caused to operate as the heat pump.

In the mode for heating the air inside of the vehicle and raising the temperature of the battery, control is performed so that the coolant and the refrigerant flow in the same manner than in the second mode for heating the air inside of the vehicle.

Additionally, the electric power of the battery module BM is supplied to the heater 31, and thus the temperature of the coolant flowing through the heater 31 is raised, raising the temperature of the battery module BM to an appropriate temperature. Furthermore, the coolant flowing through the heater 31 circulates and then flows through the chiller 32. Accordingly, the refrigerant evaporates and absorbs heat while flowing through the chiller 32, and circulates back to the compressor 21, smoothly operating the compressor 21.

When the heater 31 and the chiller 32 are positioned physically adjacent to each other, heat may be caused to be transferred from the outside of the heater 31 to an external surface of the chiller 32, and thus the heater 31 may directly raise the temperature of the chiller 32.

The coolant of which the temperature is raised in the battery temperature management unit 10 circulates, and thus the temperature of the battery module BM is raised so that the battery module BM may achieve optimal performance.

Furthermore, in the air conditioning unit 20 and the battery temperature management unit 10, the internal heat exchanger 23 operates as a condenser in the same manner as in the second mode for heating the air inside of the vehicle, and the external heat exchanger 22 operates as an evaporator. Thus, in the internal heat exchanger 23, the heat of the refrigerant is radiated, heating the air inside of the vehicle.

Furthermore, the term related to a control device such as "controller", "control apparatus", "control unit", "control device", "control module", or "server", etc refers to a hardware device including a memory and a processor configured to execute one or more steps interpreted as an algorithm structure. The memory stores algorithm steps, and the processor executes the algorithm steps to perform one or more processes of a method in accordance with various exemplary embodiments of the present disclosure. The control device according to exemplary embodiments of the present disclosure may be implemented through a nonvolatile memory configured to store algorithms for controlling operation of various components of a vehicle or data about software commands for executing the algorithms, and a processor configured to perform operation to be described above using the data stored in the memory. The memory and the processor may be individual chips. Alternatively, the memory and the processor may be integrated in a single chip. The processor may be implemented as one or more processors. The processor may include various logic circuits and operation circuits, may process data according to a program provided from the memory, and may be configured to generate a control signal according to the processing result.

The control device may be at least one microprocessor operated by a predetermined program which may include a series of commands for carrying out the method included in the aforementioned various exemplary embodiments of the present disclosure.

The aforementioned invention can also be embodied as computer readable codes on a computer readable recording medium. The computer readable recording medium is any data storage device that can store data which may be thereafter read by a computer system and store and execute program instructions which may be thereafter read by a computer system. Examples of the computer readable recording medium include Hard Disk Drive (HDD), solid state disk (SSD), silicon disk drive (SDD), read-only memory (ROM), random-access memory (RAM), CD-ROMs, magnetic tapes, floppy discs, optical data storage devices, etc and implementation as carrier waves (e.g., transmission over the Internet). Examples of the program instruction include machine language code such as those generated by a compiler, as well as high-level language code which may be executed by a computer using an interpreter or the like.

In various exemplary embodiments of the present disclosure, each operation described above may be performed by a control device, and the control device may be configured by a plurality of control devices, or an integrated single control device.

In various exemplary embodiments of the present disclosure, the scope of the present disclosure includes software or machine-executable commands (e.g., an operating system, an application, firmware, a program, etc.) for facilitating operations according to the methods of various embodiments to be executed on an apparatus or a computer, a non-transitory computer-readable medium including such software or commands stored thereon and executable on the apparatus or the computer.

In various exemplary embodiments of the present disclosure, the control device may be implemented in a form of hardware or software, or may be implemented in a combination of hardware and software.

Furthermore, the terms such as "unit", "module", etc. included in the specification mean units for processing at least one function or operation, which may be implemented by hardware, software, or a combination thereof.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The term "and/or" may include a combination of a plurality of related listed items or any of a plurality of related listed items. For example, "A and/or B" includes all three cases such as "A", "B", and "A and B".

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described in order to explain certain principles of the invention and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. A vehicle control system into which battery temperature management and air conditioning are integrated, the vehicle control system comprising:

a battery temperature management unit configured to set a temperature of a battery module provided in a vehicle to be in a predetermined range, by circulating a coolant to the battery module;

an air conditioning unit configured to operate as an air conditioner or a heat pump according to a circulation direction of a refrigerant;

a heat exchange unit configured to cause the coolant and the refrigerant to exchange heat with each other; and a controller configured to perform a control of the battery temperature management unit, the air conditioning unit and the heat exchange unit, so that the battery temperature management unit operates, that the air conditioning unit operates as the air conditioner or the heat pump according to a request for cooling of air inside of the vehicle or a request for heating of the air inside of the vehicle, and that the heat exchange unit selectively absorbs heat of the refrigerant, wherein the heat exchange unit includes:

a heater, supplied with electric power from the battery module, wherein a temperature of the heater is raised when an operational signal is input into the heater from a control signal of the controller and a coolant line along which the coolant circulates passing through the heater in the battery temperature management unit; and a chiller provided on the coolant line and spaced away from the heater, and an air conditioning line along which the refrigerant circulates passing through the chiller, wherein the air conditioning unit includes:

a first air conditioning line, the refrigerant circulating along the first air conditioning line and a compressor, a direction switching valve, an external heat exchanger provided outside of the vehicle, a first expansion valve, and an internal heat exchanger provided inside of the vehicle being sequentially provided on the first air condition line;

a second air conditioning line branching off from the first air conditioning line and passing through a second expansion valve and the chiller; and a third air conditioning line connecting between the first air conditioning line and the second air conditioning line, wherein a first path control valve is provided between the first expansion valve and the second expansion valve, wherein a third path control valve is provided on the third air conditioning line, wherein the first path control valve is open when the air conditioning unit operates as the air conditioner, and is closed when the air conditioning unit operates as a heat pump, and wherein the third path control valve is closed when the air conditioning unit operates as the air conditioner, and is opened when the air conditioning unit operates as a heat pump.

2. The vehicle control system of claim 1, wherein, when the refrigerant needs to absorb the heat from the coolant, the refrigerant is supplied from the air conditioning unit to the chiller.

3. The vehicle control system of claim 1,
wherein the controller is configured to cause the refrigerant to circulate along the first air conditioning line, causing the air conditioning unit to operate as the air conditioner when the request for cooling of the air inside of the vehicle is made from the inside of the vehicle,
wherein the controller is configured to cause the refrigerant to circulate, when the request for heating of the air inside of the vehicle is made, along the first air conditioning line, causing the air conditioning unit to operate as the heat pump inside of the vehicle, and
wherein the controller is configured to cause the refrigerant to circulate along the second air conditioning line, causing the air conditioning unit to operate as the air conditioner when the refrigerant needs to absorb the heat.

4. The vehicle control system of claim 1,
wherein the first expansion valve and the second expansion valve are sequentially provided, from the external heat exchanger toward the internal heat exchanger, between the external heat exchanger and the internal heat exchanger on the first air conditioning line,
wherein the second air conditioning line branches off from the first air conditioning line between the first path control valve and the second expansion valve, and joins the first air conditioning line between the internal heat exchanger and the direction switching valve,
wherein a third expansion valve is provided between a point where the second air conditioning line branches off from the first air conditioning line and the chiller,
wherein a second path control valve is provided between the chiller and a point where the second air conditioning line joins the first air conditioning line on the second air conditioning line,
wherein the third air conditioning line connects between a point on the first air conditioning line between the direction switching valve and the external heat exchanger and a point on the second air conditioning line between the chiller and the second path control valve.

5. The vehicle control system of claim 4, wherein, when the request for cooling of the air inside of the vehicle is made from the inside of the vehicle, the controller is configured to perform control so that the refrigerant circulates back to the compressor from the compressor through the external heat exchanger and the internal heat exchanger in the air conditioning unit and that the refrigerant is expanded in the second expansion valve.

6. The vehicle control system of claim 4, wherein, when a request for cooling of the battery module is made from the battery module, the controller is configured to perform control so that the refrigerant circulates back to the compressor from the compressor through the external heat exchanger and the chiller in the air conditioning unit and that the refrigerant is expanded in the third expansion valve and the battery temperature management unit circulates the coolant along the coolant line.

7. The vehicle control system of claim 4, wherein, when the request for cooling of the air inside of the vehicle is made from the inside of the vehicle and a request for cooling of the battery module is made from the battery module, the controller is configured to perform control so that a part of the refrigerant circulates back to the compressor from the compressor through the external heat exchanger and the internal heat exchanger and that the part of the refrigerant is expanded in the second expansion valve, and the controller is configured to perform control so that a rest of the refrigerant circulates back to the compressor from the compressor through the external heat exchanger and the chiller and that the rest of the refrigerant is expanded in the third expansion valve, and the battery temperature management unit circulates the coolant along the coolant line.

8. The vehicle control system of claim 4, wherein, when the request for heating of the air inside of the vehicle is made from the inside of the vehicle, the controller is configured to perform control so that the refrigerant circulates back to the compressor from the compressor through the internal heat exchanger and the external heat exchanger and that the refrigerant is expanded in the first expansion valve.

9. The vehicle control system of claim 4, wherein, when the request for heating of the air inside of the vehicle is made from the inside of the vehicle and a temperature of outside air is a temperate at which the refrigerant is not able to evaporate in the external heat exchanger, the controller is configured to perform control so that the refrigerant circulates back to the compressor from the compressor through the internal heat exchanger and the chiller and that the refrigerant is expanded in the third expansion valve.

10. The vehicle control system of claim 4, wherein, when the request for heating of the air inside of the vehicle is made from the inside of the vehicle, a request for raising of a temperature of the battery module is made from the battery module, and a temperature of outside air is a temperate at which the refrigerant is not able to evaporate in the external heat exchanger, the controller is configured to perform control so that the refrigerant circulates back to the compressor from the compressor through the internal heat exchanger, the third expansion valve, and the chiller, and the controller is configured to apply electric power to the heater and circulates the coolant along the coolant line.

11. The vehicle control system of claim 4, wherein, a plurality of battery modules are provided and are arranged in parallel with each other, and the battery temperature management unit, the heat exchange unit, and the air conditioning unit are provided to each of the battery modules.

12. The vehicle control system of claim 11, wherein, when the request for cooling of the air inside of the vehicle is made from the inside of the vehicle and a request for cooling of at least one battery module is made from the at least one battery module, the controller is configured to independently control the battery temperature management unit, the heat exchange unit, and the air conditioning unit that are linked with the at least one battery module, from which the request for cooling of the at least one battery module is input, and the battery temperature management unit, the heat exchange unit, and the air conditioning unit that are linked with the at least one battery module, from which the request for cooling of the at least one battery module is not input.

13. The vehicle control system of claim 12, wherein, when the request for cooling of the air inside of the vehicle is made from the inside of the vehicle and a request for cooling of at least one battery module is made from the at least one battery module, the controller is configured to independently control the battery temperature management unit, the heat exchange unit, and the air conditioning unit that are linked with the at least one battery module, from which the request for cooling of the at least one battery module is input, so that the refrigerant circulates back to the compressor from the compressor through the external heat exchanger, the second expansion valve, and the internal heat exchanger, and the controller is configured to control the battery temperature management unit, the heat exchange unit, and the air conditioning unit that are linked with the at least one battery module, from which the request for cooling of the at least one battery module is not input, so that the refrigerant circulates back to the compressor from the compressor through the external heat exchanger, the third expansion valve, and the chiller and that the coolant circulates along the coolant line.

14. A method of controlling the vehicle control system of claim 1, wherein the controller is configured to cause the refrigerant to circulate along the first air conditioning line, causing the air conditioning unit to operate as the air conditioner when the request for cooling of the air inside of the vehicle is made from the inside of the vehicle, wherein the controller is configured to cause the refrigerant to circulate along the first air conditioning line, causing the air conditioning unit to operate as the heat pump when the request for heating of the air inside of the vehicle is made from the inside of the vehicle, and wherein the controller is configured to cause the refrigerant to circulate along the second air conditioning line, causing the air conditioning unit to operate as the air conditioner when the refrigerant needs to absorb the heat.

* * * * *